United States Patent [19]

Brantley, Jr. et al.

[11] Patent Number: 5,163,149

[45] Date of Patent: Nov. 10, 1992

[54] COMBINING SWITCH FOR REDUCING ACCESSES TO MEMORY AND FOR SYNCHRONIZING PARALLEL PROCESSES

[75] Inventors: William C. Brantley, Jr., Mount Kisco; Harold S. Stone, Chappaqua, both of N.Y.

[73] Assignee: International Business Machines Corporation, Armonk, N.Y.

[21] Appl. No.: 266,424

[22] Filed: Nov. 2, 1988

[51] Int. Cl.⁵ .......................................... G06F 13/372
[52] U.S. Cl. ............................... 395/650; 364/228.1; 364/229.3; 364/230.6; 364/270.7; 364/DIG. 2; 395/550
[58] Field of Search ... 364/200 MS File, 900 MS File; 370/94.1, 103, 85.4; 395/650, 550

[56] References Cited

U.S. PATENT DOCUMENTS

| | | | |
|---|---|---|---|
| 4,404,557 | 9/1983 | Grow | 370/84 |
| 4,495,617 | 1/1985 | Ampulski | 370/85.4 |
| 4,512,014 | 4/1985 | Binz | 370/84 |
| 4,530,091 | 7/1985 | Crockett | 370/60 |
| 4,536,876 | 8/1985 | Bahr | 370/103 |
| 4,539,679 | 9/1985 | Bux et al. | 370/85.4 |
| 4,543,630 | 9/1985 | Neches et al. | 364/200 |
| 4,549,291 | 10/1985 | Renoulin | 370/85.2 |
| 4,604,742 | 8/1986 | Hamada | 370/85.4 |
| 4,609,920 | 9/1986 | Segarra | 370/85.4 |
| 4,663,748 | 5/1987 | Karbowiak | 370/85.12 |
| 4,677,614 | 6/1987 | Circo | 370/103 |
| 4,680,757 | 7/1987 | Murakami | 370/85.4 |
| 4,704,680 | 11/1987 | Saxe | 364/200 |
| 4,709,364 | 11/1987 | Hasegawa | 370/85.4 |
| 4,713,807 | 12/1987 | Caves | 370/85.4 |
| 4,746,920 | 5/1988 | Nellen | 370/103 |
| 4,747,130 | 5/1988 | Ho | 364/200 |
| 4,754,395 | 6/1988 | Weisshaar | 364/200 |
| 4,771,423 | 9/1988 | Ohya | 370/103 |
| 4,805,167 | 2/1989 | Leslie | 370/84 |
| 4,814,762 | 3/1989 | Franaszek | 340/825.79 |
| 4,815,110 | 3/1989 | Benson | 370/103 |
| 4,833,468 | 5/1989 | Larson et al. | 370/63 |
| 4,847,754 | 7/1989 | Obermarck | 364/200 |
| 4,926,446 | 5/1990 | Grover | 370/103 |
| 4,930,121 | 5/1990 | Shiobara | 370/85.4 |
| 4,989,131 | 1/1991 | Stone | 364/200 |

OTHER PUBLICATIONS

The NYU Ultra Computer-Designing an MIMO Shared Memory Parallel Computer, by A. Gottlieb et al., IEEE transactions on computers vol. C-32, Feb. 1983, pp. 175-189.

Shift arithmetic on a token ring network, by M. Livny and U. Manber IEEE, 1985 pp. 301-304.

The IBM Research Parallel Processor Prototype (RP3) Introduction and Architecture, by G. F. Pfister et al., 1985, IEEE, pp. 764-771.

Primary Examiner—Thomas C. Lee
Assistant Examiner—Eric Coleman
Attorney, Agent, or Firm—Joseph J. Kaliko; Ronald Drunheller

[57] ABSTRACT

A combining switch that reduces memory accesses, synchronizes parallel processors and is easy to implement, is achieved by configuring a plurality of parallel processing nodes in a ring arrangement and by implementing a synchronizing instruction for the switch that facilitates, rather than inhibits, parallel processing. According to the preferred embodiment of the invention the ring is a token ring and the synchronizing instruction is a Fetch-and-Add instruction.

24 Claims, 8 Drawing Sheets

FIG. 1  A TOKEN-RING STRUCTURE

TRANSMITTER BEHAVIOR FOR MESSAGES IN "INITIAL" STATE.

FIG. 4

MEMORY ACTIONS FOR MEMORY UPDATE.

COMBINING SWITCH FOR REDUCING ACCESSES TO MEMORY AND FOR SYNCHRONIZING PARALLEL PROCESSES

BACKGROUND OF THE INVENTION

1. Field of the Invention

The present invention relates generally to combining switches used to support parallel processing. More particularly, the invention relates to a token ring switch wherein the processors within the ring combine operations (for example, Fetch-and-Add instructions), thereby reducing accesses to memory and allowing efficient implementation of processor synchronization.

2. Description of the Related Art

Gottlieb et al, in an article published in the February, 1983 IEEE Transactions On Computers (Vol. C-32, No. 2), entitled "The NYU Ultracomputer—Designing an MIMD Shared Memory Parallel Computer", describes the use of a multilevel switching network as a combining switch.

The machine described in the Gottlieb et al article implements a Fetch-and-Add instruction. The effect of this instruction when executed concurrently by N processors that attempt to update a single shared variable, is to combine the updating information in the switching network so that only a single access to physical memory is necessary to effect the N updates. A second effect of the instruction is that each of the N processors is returned a result that would have been observed for some serial ordering of the updates. Therefore the combining switch simulates the serial updating of the shared variable while actually performing the update in a parallel manner. The memory access rate is greatly reduced from the potential peak access rate and the processors can synchronize and serialize their actions where necessary, yet the time required for this to occur grows at most logarithmically in N.

The Gottlieb combining switch is inherently complex and costly, finding its principal application in supporting large numbers (hundreds or even thousands) of processing nodes. Many applications, such as local area networks, require the support of far fewer (e.g., usually less then fifty) processing nodes.

Well known ring networks, such as the token ring network described in the IEEE 802.5 standard, would be more suitable for such applications; however, the use of ring networks as both a combining switch and means for performing processor synchronization is heretofore unknown.

The concept of "modifying sums" as they pass around a token ring is described in an article by Livny et al, published by the IEEE in The Proceedings of the 1985 International Conference on Parallel Processing, in an article entitled "Shift Arithmetic On A Token Ring Network". Livny et al does not teach that a token ring can be used for synchronization nor does the prior art, in general, suggest implementing a Fetch-and-Add instruction in a ring context for the purpose of processor synchronization. Typically, synchronization in a ring is accomplished by other means, such as the passing of tokens.

Pfister et al, in an article published by the IEEE in The Proceedings of the 1985 International Conference on Parallel Processing, entitled "The IBM Research Parallel Processor Prototype (RP3); Introduction and Architecture", and U.S. Pat. No. 4,543,630, issued Sep. 24, 1985 to Neches, further exemplify the state of the art in switches that perform a combining function.

The combining switch taught by Pfister is an implementation of the Gottlieb et al machine. It too is complex and again directed toward handling a large number of processing nodes.

The Neches patent describes a tree network that may be used to synchronize multiple processors and can perform some data base operations, such as JOIN, in parallel across the network. However, when synchronization is performed in accordance with the Neches teachings, the synchronization operation forces serial operation of the processors, whereas when synchronization is done with Fetch-and-Add and a combining switch as taught by Gottlieb et al, the synchronization permits the processors to proceed immediately with parallel execution, unlike the teaching of Neches.

Accordingly, it would be desirable to be able to perform the synchronizing function using a combining switch that does not dictate serial processor operation, i.e., the switch should facilitate parallel processing while performing synchronization. Furthermore, it would be desirable if such switch were easier to implement than complex combining switches such as those described by Gottlieb et al and Pfister et al. Lower cost, increased reliability and minimizing required memory accesses would be further desirable features and by products of such a switch.

As used hereinafter, a "combining switch" shall be defined as a switch that receives requests to update a shared variable, and combines together update requests to the same shared variable so that the variable is updated only once.

SUMMARY OF THE INVENTION

It is therefore the principal object of the invention to provide a combining switch which reduces memory accesses, synchronizes parallel processors and is easy to implement.

It is a further object of the invention to avoid utilizing complex combining switch technology to achieve the principal objective of the invention, particularly where the number of processing nodes in the switch is relatively small (less then 50 nodes).

According to the invention the aforesaid objectives are achieved by configuring a plurality of parallel processing nodes in a ring arrangment to serve as the combining switch and by implementing a synchronizing instruction for the switch that facilitates, rather than inhibits, parallel processing. According to the preferred embodiment of the invention the ring is a token ring and the synchronizing instruction is a Fetch-and-Add instruction.

The invention features methods and apparatus that are both low cost and easy to implement when compared with the complex combining switches taught by the prior art as typified by Gottlieb et al and Pfister et al.

When synchronization is performed in the token ring by use of the Fetch-and-Add instruction, parallel processing is facilitated thereby distinguishing the invention from the techniques taught by Livny et al and Neches.

These and other objects and features will be recognized by those skilled in the art upon reviewing the detailed description se forth hereinafter in conjunction with the Drawing.

DESCRIPTION OF THE PREFERRED EMBODIMENTS

The following is a description of a combining switch wherein the processors are arranged in a ring configuration and further wherein the Fetch-and-Add synchronizing instruction is implemented. Those skilled in the art will readily appreciate that various types of ring structures and other synchronizing instructions could be implemented without departing from the scope or spirit of the invention.

Although well known to those skilled in the art, the characteristics of the Fetch-and-Add instruction, implemented in accordance with the preferred embodiment of the invention, will be set forth immediately hereinafter for the sake of completeness.

The Fetch-and-Add instruction has the following characteristics:

1. Fetch-and-Add has two operands—an address and an increment. In the absence of concurrent operations, when a processor issues the instruction with an address A and an increment I, at the completion of the instruction the item at address A is incremented by the value I, and the processor is returned the value of the item at the address A just prior to the increment.

2. When two or more processors issue Fetch-and-Add instructions concurrently to the same address A, then the item in A is updated but once for all requests, and it receives the sum of the increments. The values returned to the processors is a set of values that would have been received for some serial execution of the Fetch-and-Add instructions.

Figure 1:
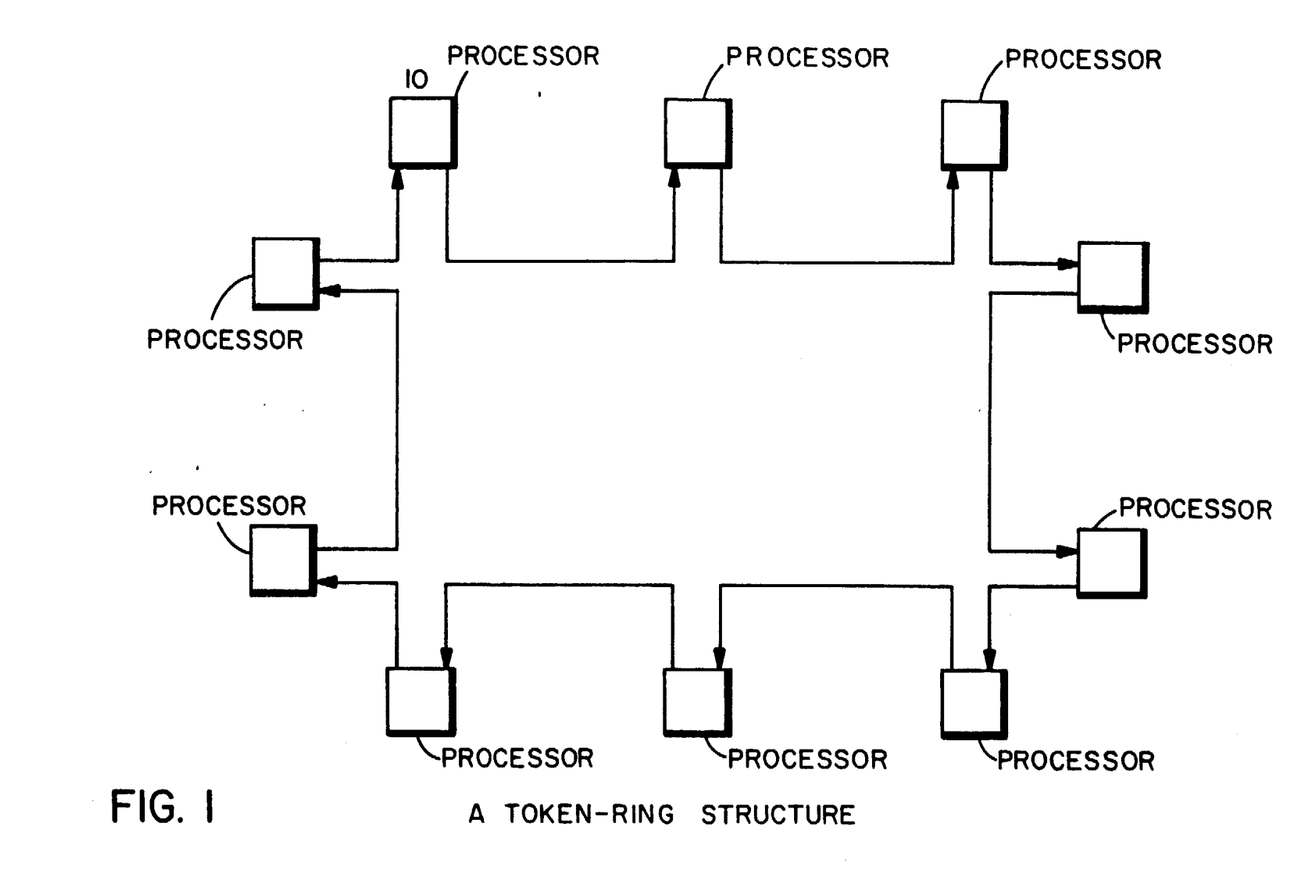
FIG. 1 depicts a computer network/combining switch configured as a ring in accordance with the teachings of the invention.

A model of a computer network that supports the invention is a ring connection as shown in FIG. 1. Each processor, 10, is connected to a ring connection via two unidirectional links. One link is an input link from a predecessor processor, and the other is an output link to a successor processor. Messages circulate around the loop and are governed by a loop protocol.

Many possibilities for such a protocol exist within the prior art. As indicated hereinbefore, the IEEE 802.5 standard describes an implementation that is known as a token ring. For the sake of illustration, a token ring will be the context in which the invention is described.

At each node in the ring depicted in FIG. 1, there exists a network interface. At the network interface, each incoming message is examined and repeated at the output port delayed by a small amount. In this manner messages circulate from processor to processor around the ring.

It is assumed hereinafter that a transmitting node has the ability to break the ring so that messages originated by the transmitter can circulate around the ring and can be stopped when they eventually reach the transmitter to prevent continuous circulation of messages. This capability is incorporated into the IEEE 802.5 standard and other protocols that exist within the prior art.

According to the preferred embodiment of the invention, to perform a Fetch-and-Add instruction, the transmitter issues a message containing the following information:

1. The type of message (in this case set to "Fetch-and-Add").
2. The state of the message, which is set to "INITIAL" just prior to the original transmission of the message.
3. The address of the variable to update.
4. The increment for the update.

As the message passes around the ring, each processor that wishes to update that shared variable adds its increment to the increment in the message. When the message reaches the shared memory, (assuming all processors wishing to increment the shared variable have had the chance to add their increments to the circulating message), the memory responds by reading the present contents of the shared variable, by replacing the increment in the message with the value of the shared variable and by updating the shared variable with the sum of increments collected (for a Fetch-and-Add). The value of the shared variable (prior to its having been updated) circulates on the ring from the memory to the transmitter of the original message. The transmitter then sends a new message around the ring (one containing the value of the shared variable prior to update).

As each processor receives the new message it adds its increment to the increment in the message and passes the value to the next processor. The result of the second activity is that each processor receives a value that would have been observed if the memory were updated N times rather than just once.

Figure 2:
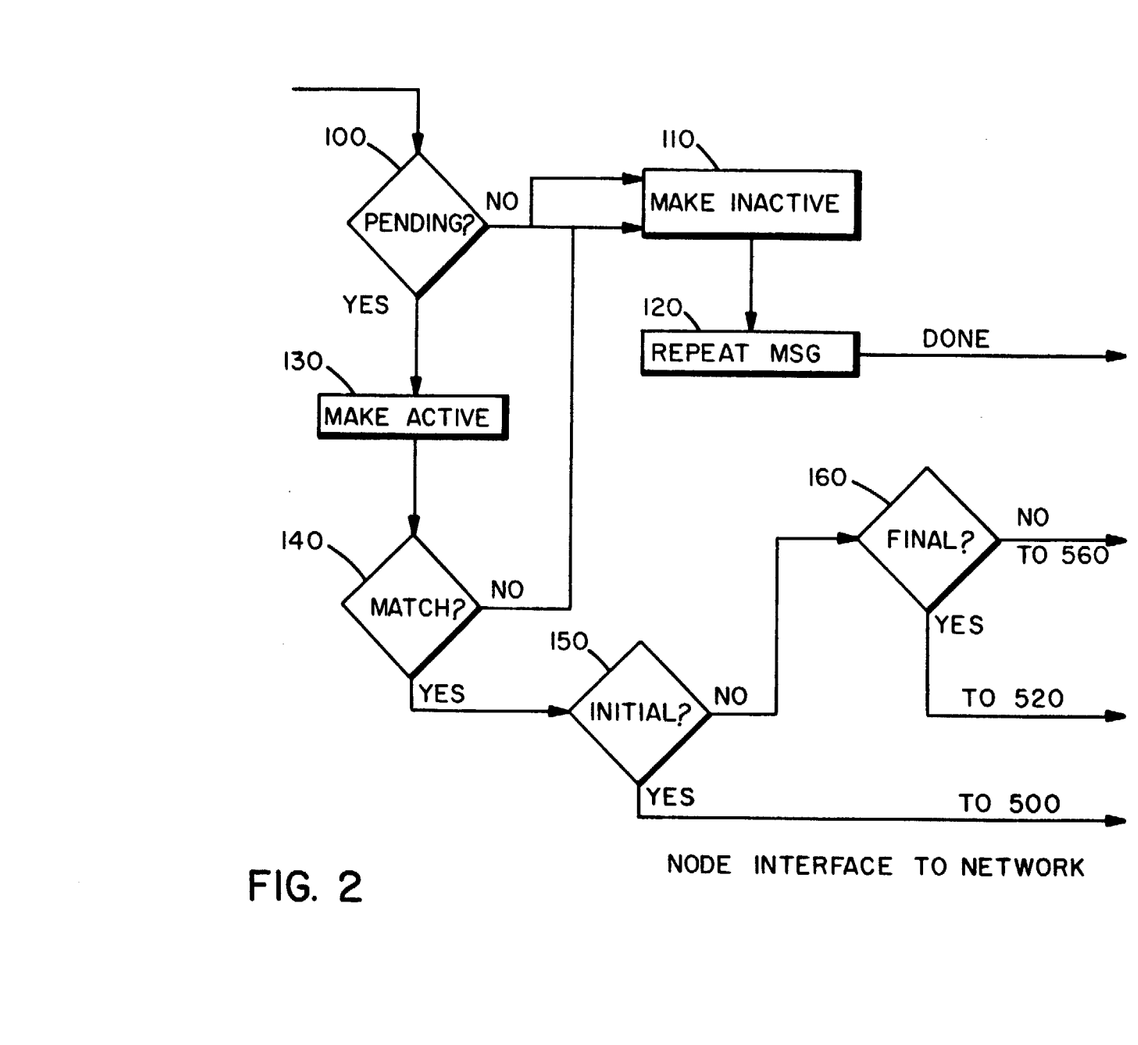
FIG. 2 is a flow diagram depicting the behavior of the network interface for each processor node of the computer network shown in FIG. 1, where each node supports the implementation of a Fetch-and-Add instruction on the ring.

If it assumed that the network interface introduces a 1-bit delay between input and output. The behavior of the network interface of each processor during the initial phase of message transmission is depicted in FIG. 2. Each node responds as follows during this phase:

1. If the node has a Fetch-and-Add pending, (decision block 100) it becomes active at logic block 130 and otherwise becomes inactive at logic block 110. Once inactive, the node moves to logic block 120 where it ignores the remainder of message while repeating the transmission.

2. While the node is active at logic block 130, the node eventually observes the address field of the message. At logic block 140, the node compares the address in the message to the address for its pending Fetch-and-Add. If the two addresses match, the node remains active at logic block 150, and otherwise the node becomes inactive at logic block 110, and at logic block 120 it ignores the remainder of the message while repeating the transmission.

Figure 3:
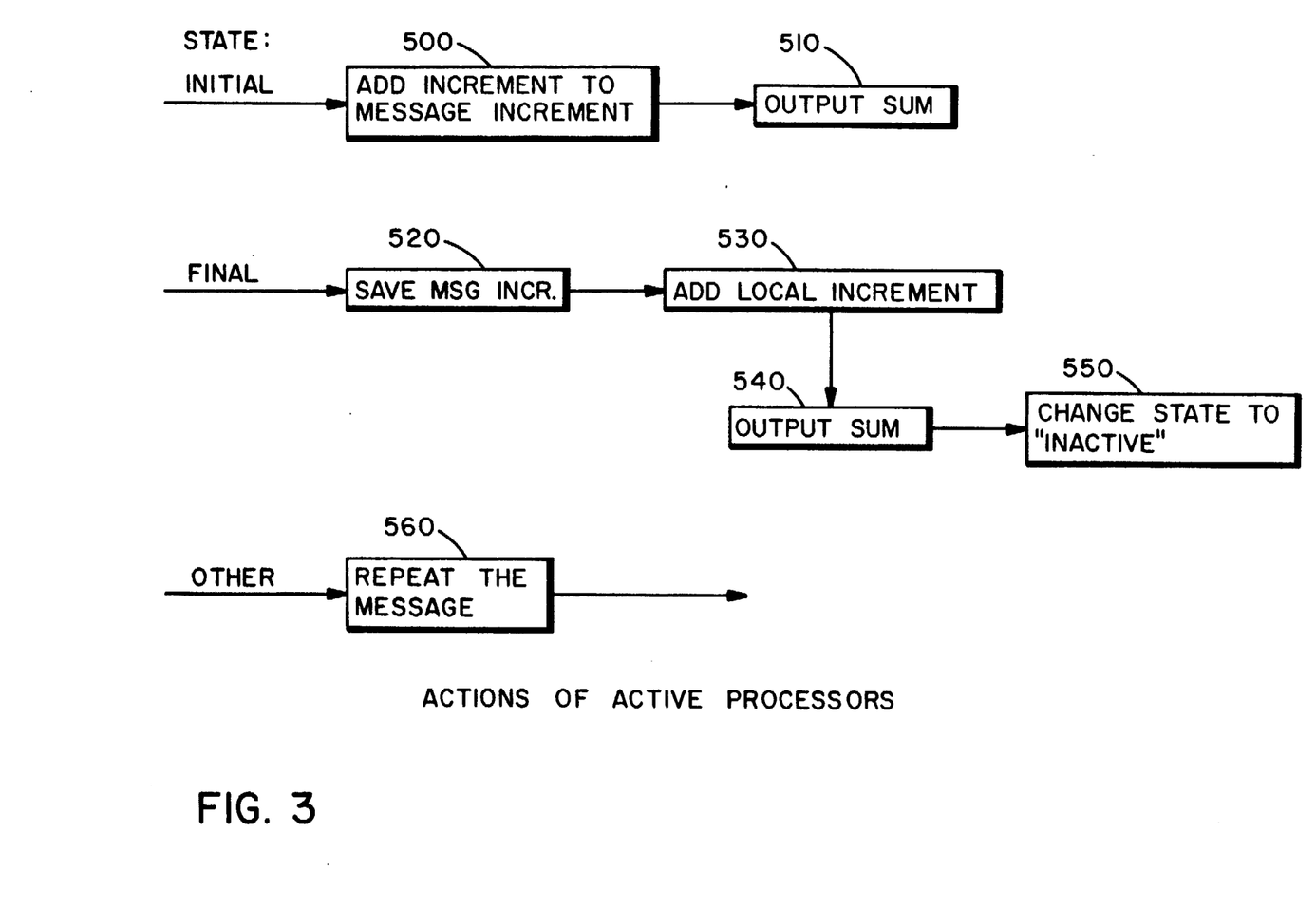
FIG. 3 is a continuation of FIG. 2 more particularly detailing node behavior for processors which are active.

3. At logic block 150, the node examines the state of the incoming message. If the state of the message is "INITIAL", the node behavior is described at logic blocks 500 and 510 in FIG. 3. With reference to FIG. 3, it can be seen that the processor at the node adds its increment to the incoming increment (block 500) and puts the result on the output port (block 510). This can be done synchronously with the message transmission if the input values appear in binary-encoded fashion, least-significant bit first. The processor performs binary addition in bit-serial fashion, producing one output bit for each input bit.

4. In FIG. 2, if an active node detects a message that is not in the initial state, it determines if the state is "FINAL" or some other state in logic block 160. The actions taken under these conditions occur on message circulations after the first circulation, and are described hereinafter.

As the message passes through successive nodes, it eventually comes to the node that holds the shared variable, and the message may reach this node with the shared variable before all processors on the ring have had an opportunity to add their increments to the increment of the Fetch-and-Add It is assumed that the memory cannot respond to the Fetch-and-Add in one bit time.

There are several alternative ways that the system can behave, given that the Fetch-and-Add cannot complete its operation in a single cycle. The following, presented for the sake of illustration only, is a description of one such approach.

The processor with the shared variable initiates an access to the shared variable when it discovers the address in the message matches the address of the share variable. The message on the ring can optionally be modified at this point to indicate that an access has been started if the system requires this information for other purposes or to assure reliable operation.

Figure 4:
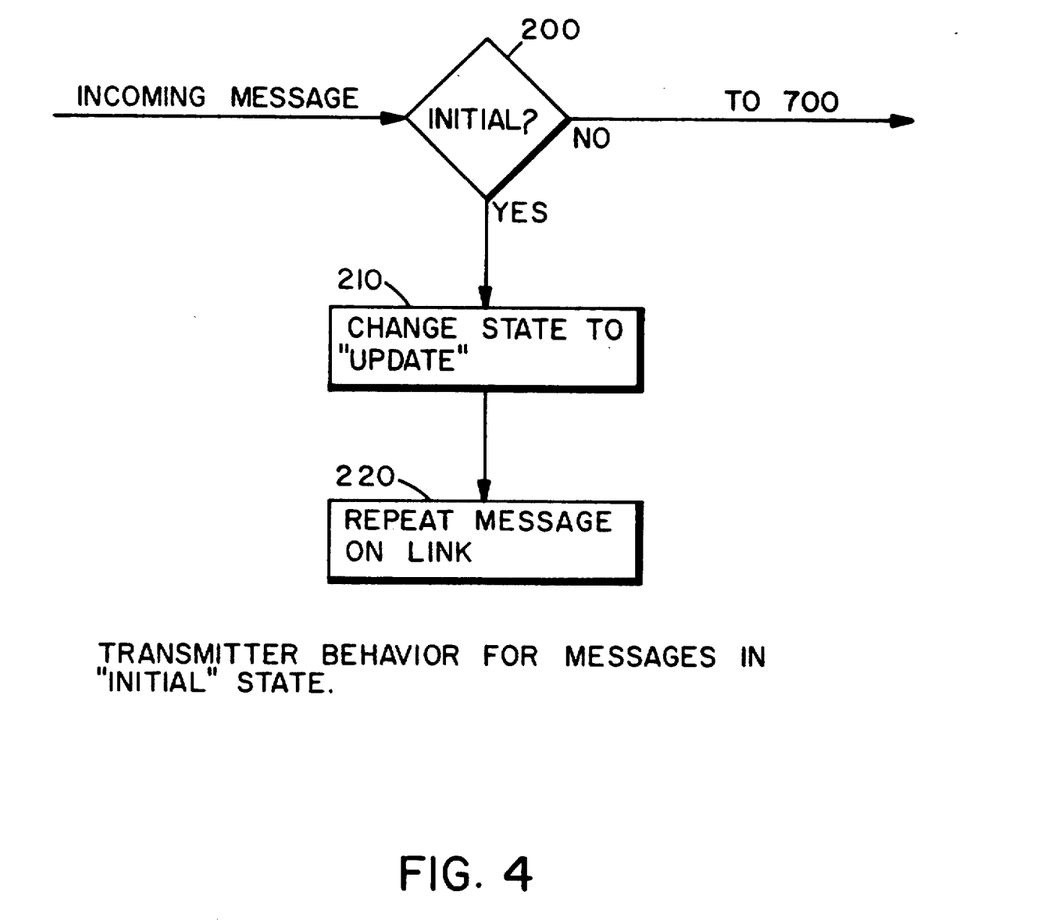
FIG. 4 is a flow diagram depicting transmitter node behavior for messages determined to be in an "INITIAL" state.

At the conclusion of one full cycle of the message, the message arrives at the transmitter. When the transmitter recognizes the receipt of the message, it processes the message as described in FIG. 4. The activity beginning at logic block 200 is as follows:

1. Change the state of the message from "INITIAL" to "UPDATE" at logic block 210 (if the incoming message is not "INITIAL", as determined by logic block 200, the transmitter will behave in accordance with the description set forth hereinafter with reference to FIG. 7).

At logic block 220, the transmitter repeats the message on the link so that the message begins a second loop of the network.

Message repetition is done with a single bit delay.

Figure 5:
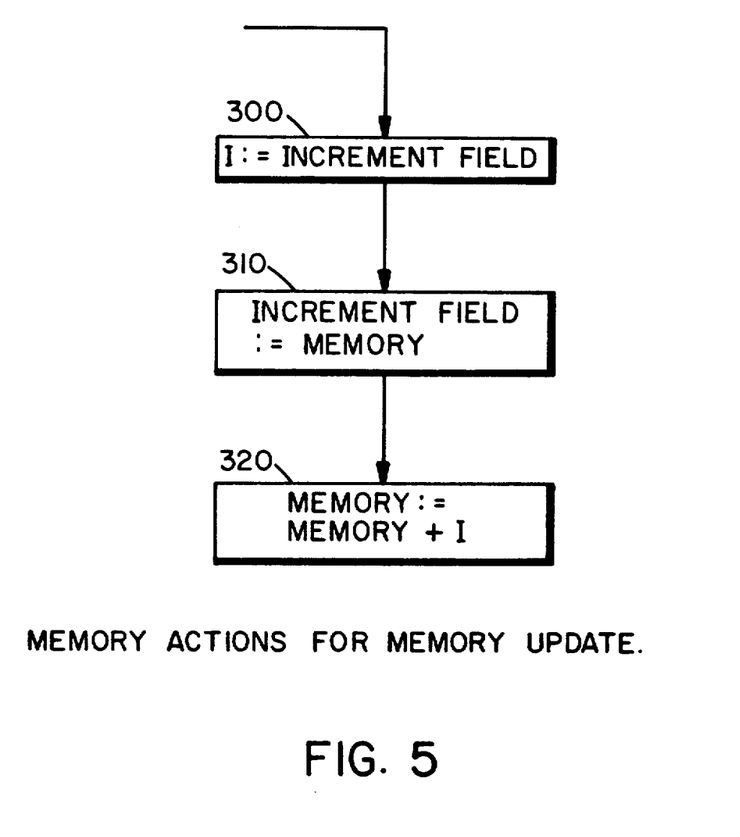
FIG. 5 is a flow diagram depicting a method for performing the update of a shared memory location.

When this message reaches the processor with the shared memory, the processor there does the following as described by FIG. 5:

1. In logic block 300, it removes the increment field I of the message.

2. In logic block 310, it replaces the increment field with the former contents of the memory. This enables the Fetch-and-Add instruction to report back the value of the shared variable before it is altered.

3. At logic block 320, the processor adds the increment I from the message to the former contents of the memory to obtain the new value of the shared variable, and stores that value in memory.

Figure 6:
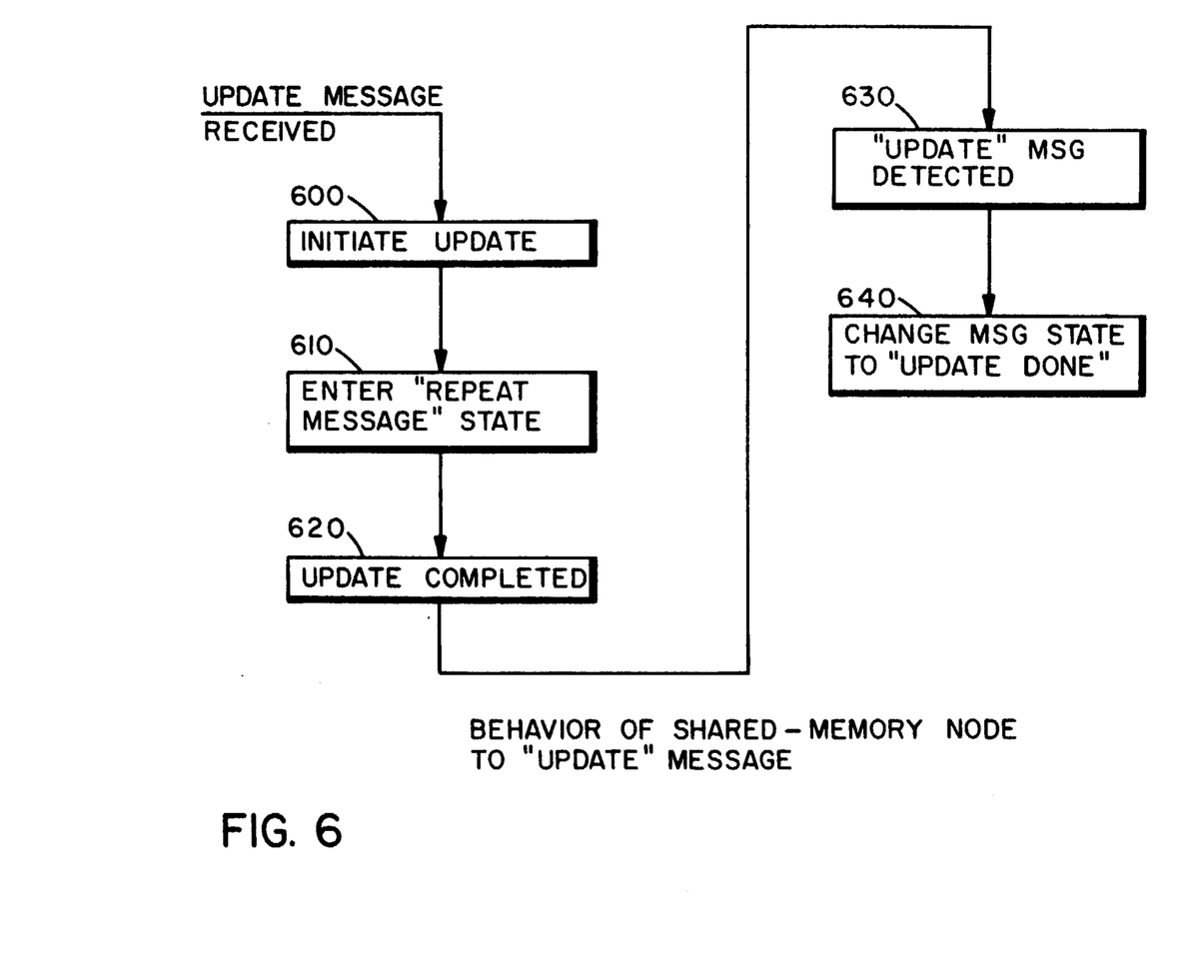
FIG. 6 is a flow diagram depicting the behavior of a shared memory node to an "UPDATE" message in accordance with the teachings of one embodiment of the invention.

The replacement of the new increment for old increment is, according to one embodiment of the invention, done bit-by-bit as the bits pas through the receiver/transmitter at a given node. If there is a possibility that the memory access has not been completed by the time the "UPDATE" message reaches the shared memory node, there should be a provision for multiple circulations to occur to hold the link until the access is complete. A suitable way for this to happen is illustrated in FIG. 6. At logic block 600, the shared memory node initiates the update of the shared variable. Until the update is completed, the node remains in a state that repeats messages on the ring without change. This is shown in logic block 610. The shared memory node completes the update of the shared variable in logic block 620. At logic block 630 it detects the incoming message entering with a state of "UPDATE". At logic block 640, the node changes the message state to "UPDATE DONE". The ring continues to circulate an "UPDATE" message until it is complete, or until an override stops the message because it has circulated too long.

Figure 7:
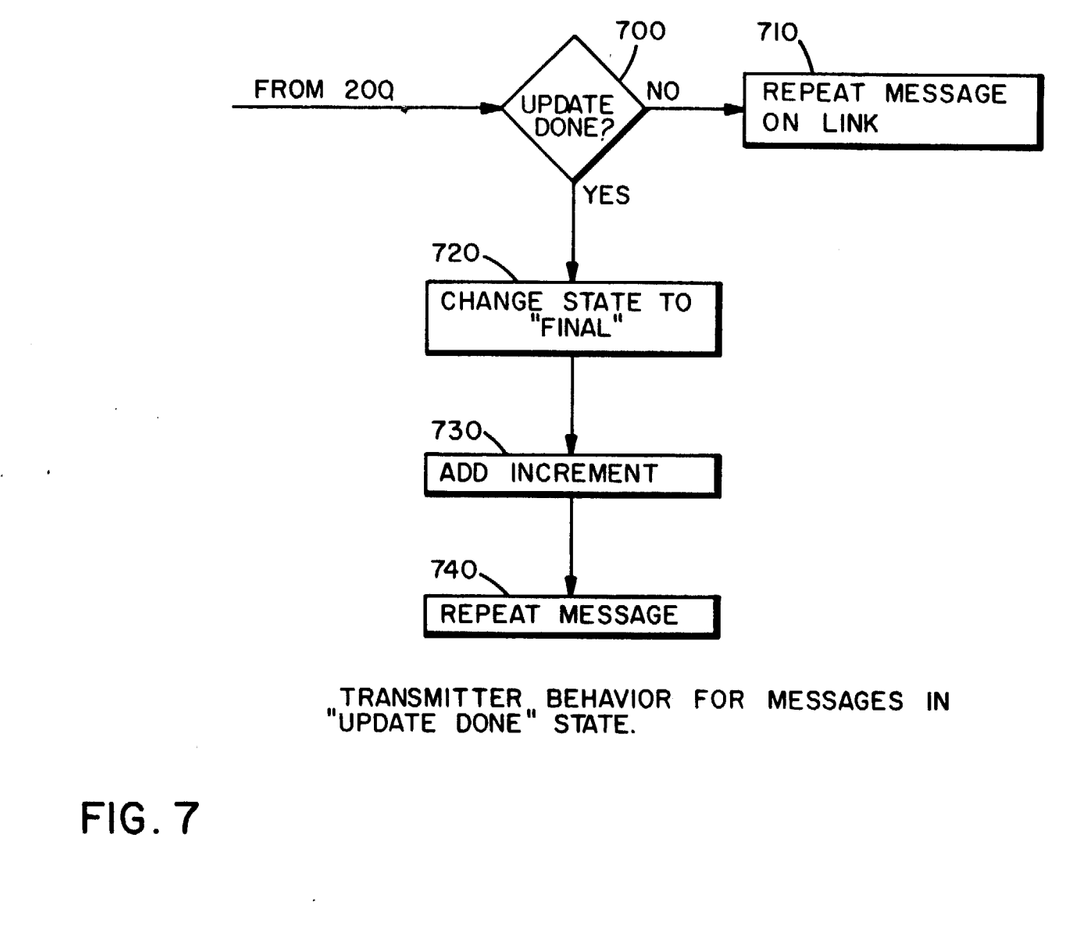
FIG. 7 is a flow diagram that illustrates transmitter behavior for massages in an "UPDATE DONE" state.

When the "UPDATE DONE" message reaches the transmitter, the transmitter may process the message as per the logic illustrated in FIG. 7. Logic block 700 checks to see if the state is "UPDATE DONE". If not, at logic block 710, the transmitter repeats the message and is otherwise passive. If logic block 700 detects the state "UPDATE DONE", then the transmitter behaves as follows:

1. Change the state to "FINAL" at logic block 720.
2. Add its local increment to the increment in the message at logic block 730.
3. Place the message on the link with the new increment at logic block 740.

The old increment is observed and saved as it arrives, bit by bit. Addition is bit serial as described earlier.

All other active processors react to a message in "FINAL" state as shown in FIG. 3, starting at logic block 520.

1. Observe and save the message increment at logic block 520.
2. Add local increment to message increment at logic block 530.
3. Output the sum produced to the network at logic block 540, and
4. Change internal state of the node to "INACTIVE" at logic block 550.

The message requires one loop iteration during the "FINAL" state, and returns to the transmitter which breaks the loop and prevents further message circulation. The transmitter then follows the loop protocol with regard to initiating a new transmission.

Because active processors can observe messages in states other than "INITIAL" or "FINAL", logic blocks 560 of FIG. 3 indicates that for such methods, an active processor simply repeats the message on the ring. Inactive processors always repeat messages.

In the implementation described hereinabove, the message circulates at least three times. The first pass collects increments, the second pass obtains the former value of the shared variable, and the third pass distributes the former value of shared variable with increments added. The number of passes can be reduced to a smaller number if the memory can react more quickly to the request. The minimum number of passes is two because each active processor has to send information to memory and each active processor has to receive information from memory. An active processor that is the immediate successor of the memory takes a full cycle to send a message to memory, and an active processor that is the immediate predecessor of the memory takes a full cycle to receive a message from memory. A message that involves both such processors therefore takes at least two full cycles (less two nodes) to complete.

What has been described is the implementation of a Fetch-and-Add instruction in a combining switch, where the switch is arranged as a token ring. Those skilled in the art will readily appreciate that memory accesses to shared variables are minimized and that the Fetch-and-Add can be utilized to synchronize the processors.

For example, it may be desirable to have a set of processors, each upon completion of a task, enter a holding pattern and wait until a "barrier" is is crossed before going forward with their processing tasks in a synchronized fashion. If a shared barrier variable were initially set to zero, the Fetch-and-Add instruction could readily be used to update the shared variable via adding an increment (say 1) as each processor completes its initial task, until a predetermined threshold value is reached. The set of processors could then be released from their holding pattern and proceed in a synchronized manner.

Figure 8:
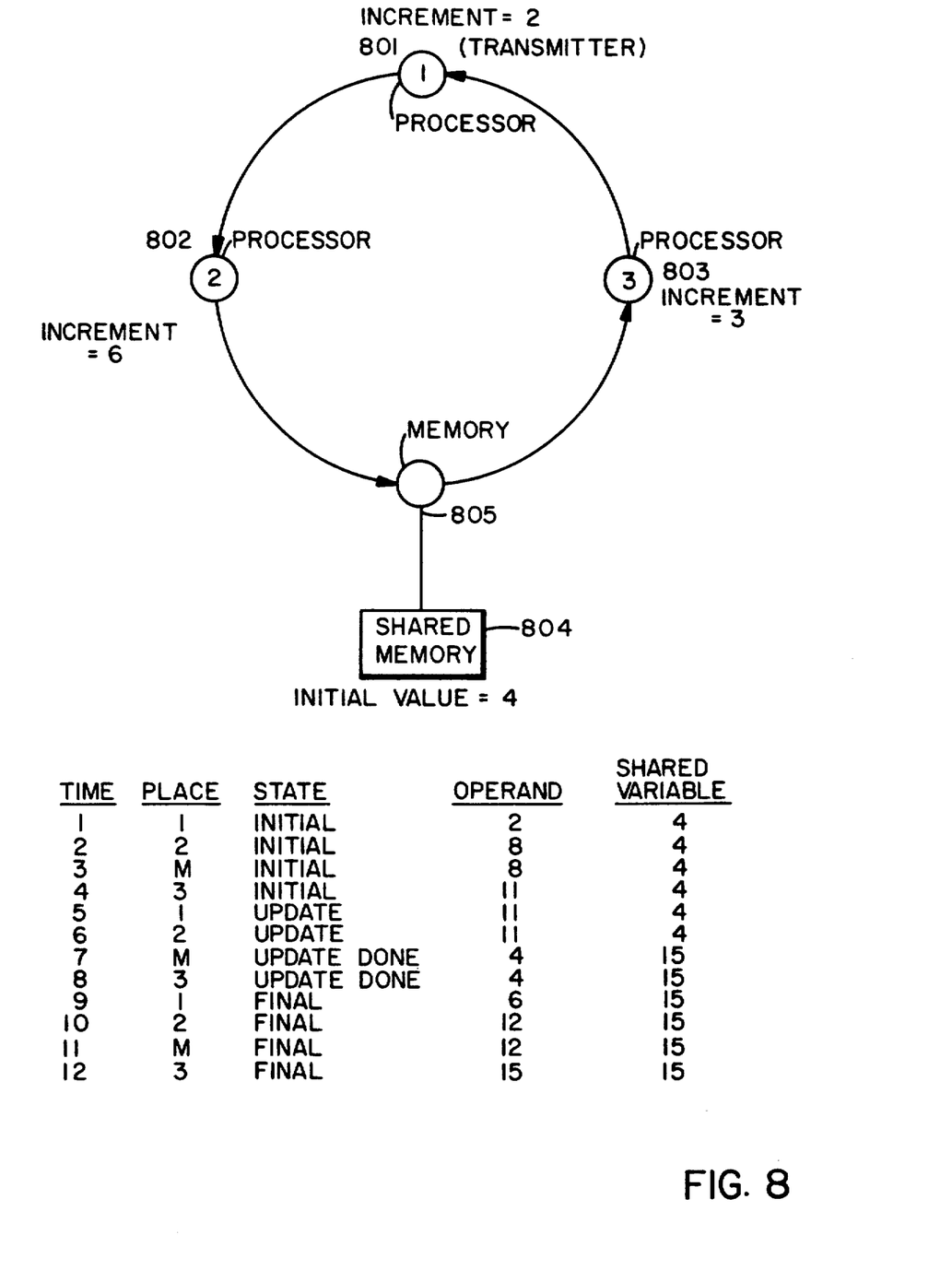
FIG. 8 depicts an example of a ring with 3 processing nodes and a memory node, together with a time oriented table indicating how the states of the various processors, operand values and shared variable values, change over time in accordance with the teachings of the invention.

Finally, FIG. 8 summarizes the operation of the combining switch described herein using a specific example. Three processors are shown, 801, 802 and 803. Shared memory 804 is shown connected to the ring at 805. The memory is further shown as having an initial value of 4.

Processor 801 is depicted in FIG. 8 as the transmitter. Increments of 2, 6 and 3, for the sake of illustration, are shown to be added to the value of the shared variable by processors 801, 802 and 803 respectively.

Beneath the ring diagram in FIG. 8 is a table which is time oriented and shows the various states of the 3 processors over time along with the operand and shared variable value over time. It should be noted that the ring indeed functions as a combining switch with only one memory access required.

The foregoing description of a preferred embodiment of the novel methods and apparatus for achieving the objects of the invention has been presented for purposes of illustration and description. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A method for implementing a combining switch for a plurality of parallel processors, comprising the steps of:
 (a) configuring said plurality of parallel processors into a ring network by interconnecting each of said plurality of processors to a successor and a predecessor processor to facilitate processor synchronization; and
 (b) implementing a synchronizing instruction on said ring by transmitting said synchronizing instruction from one of said processors for circulation to said other processors on said ring, wherein said synchronizing instruction is operative to serialize a plurality of concurrent processor requests to update a shared variable.

2. A method as set forth in claim 1 wherein said synchronizing instruction synchronizes said plurality of parallel processors during processor operation without serializing processor operation.

3. A method as set forth in claim 2 wherein said synchronizing instruction is a Fetch-and-Add instruction.

4. A method as set forth in claim 1 wherein said ring arrangement is a token ring.

5. A method as set forth in claim 1 wherein aid step of implementing a synchronizing instruction further comprises the steps of:
 (a) monitoring a value of a variable shared by the set of processors being synchronized to determine when a predetermined synchronization threshold condition is met; and
 (b) updating said variable whenever a given processor in said set of processors completes a predetermined task.

6. A method as set forth in claim 1 further including the step of interconnecting each said processor to said successor and predecessor processor by a unidirectional link.

7. A method as set forth in claim 1 further including the step of stopping the circulation of said synchronizing instruction after said synchronizing instruction returns to said processor which initially transmitted said synchronizing instruction.

8. A method as set forth in claim 1 wherein each processor defines a network node having an input port and an output port.

9. A method as set forth in claim 8 wherein an incoming message is examined and repeated at the output port after a time delay from receipt of said message at said input port.

10. A method as set forth in claim 1 wherein said synchronizing instruction assigns each of said plurality of requests a different sequential number.

11. A combining switch for combining the operation of a plurality of parallel processors, said combining switch comprising:
 (a) said plurality of parallel processors each configured as a processing node in a ring network; and
 (b) synchronizing means, including each of said processing nodes, for synchronizing said plurality of parallel processors in said ring network by implementing a synchronizing instruction on said ring that is operative to serialize a plurality of concurrent processor requests to update a shared variable.

12. Apparatus as set forth in claim 11 further comprising at least one memory element, coupled to aid ring, for storing variables shared by said plurality of parallel processing.

13. Apparatus as set forth in claim 11 wherein said synchronizing means further comprises a shared memory element, incorporated in at least one of said processing nodes, for storing variables shared by said plurality of parallel processors.

14. Apparatus as set forth in claim 11 wherein said synchronizing means operates to achieve processor synchronization around the ring without serializing processor operation.

15. The apparatus as claimed in claim 11 wherein one of said parallel processors is a transmitter for transmitting messages circulated around said ring network.

16. The apparatus as claimed in claim 15 wherein said transmitter includes means for preventing the circulation of said message around said ring network more than one time.

17. A method for implementing a combining switch for a set of N parallel processors configured as a ring network, for reducing accesses to a memory containing a variable shared by said N processors, and for synchronizing said processors utilizing a Fetch-and-Add instruction implemented on said ring network, said method comprising the steps of:
   (a) collecting and combining in said memory, within the time it takes a first message transmitted by one of said processors to circulate around the ring, each increment associated with each Fetch-and-Add instruction being executed on the ring;
   (b) circulating a second message transmitted by one of said processors around said ring for obtaining the value of said variable shared by said processors within the time it takes said second message, following said first message, to circulate around said ring, and providing said variable to a memory;
   (c) updating said variable in said memory with the result of combining said increments; and
   (d) transmitting by one of said processors within the time it takes a third message, following said second message, to circulate around said ring, the value of said variable prior to being updated together with increments added thereto, to each of the processors executing a Fetch-and-Add instruction, whereby the processors are each returned a result equivalent to a serial ordering of updates of said variable.

18. A method as set forth in claim 17 wherein the synchronizing and combining of operations for said N processors are performed within the time it takes said first, second and third messages to circulate around the ring.

19. A method as set forth in claim 18 wherein said synchronizing instruction assigns each of said plurality of requests a different sequential number.

20. A method as set forth in claim 17 further including the step of interconnecting said processors in said ring network by unidirectional links.

21. A method as set forth in claim 17 further including the step of preventing the circulation of any of said first, second and third messages around the ring more than a single time.

22. A method as set forth in claim 17 further including the step of connecting said memory to said ring network.

23. A method for implementing a combining switch for a plurality of parallel processors, comprising the steps of:
   (a) configuring said plurality of parallel processors into a ring network by interconnecting each of said plurality of processors to a successor and a predecessor processor to facilitate processor synchronization; and
   (b) implementing a synchronizing instruction on said ring by transmitting said synchronizing instruction from one of said processors for circulation to said other processors on said ring, wherein said synchronizing instruction may be used by each of said plurality of processors to facilitate the modification and retransmission of message bits without serializing processor operation.

24. A combining switch for combining the operation of a plurality of parallel processors, said combining switch comprising:
   (a) said plurality of parallel processors each configured as a processing node in a ring network; and
   (b) synchronizing means, including each of said processing nodes, for synchronizing said plurality of parallel processors in said ring network by implementing a synchronizing instruction on said ring which may be used to facilitate the modification and retransmission of message bits by each of said plurality of parallel processors without serializing processor operation.

* * * * *